April 8, 1947.　　　H. W. CRANWELL　　　2,418,579
AXLE ATTACHMENT FOR DETECTING HOT BOXES
Filed June 27, 1944　　　2 Sheets-Sheet 2
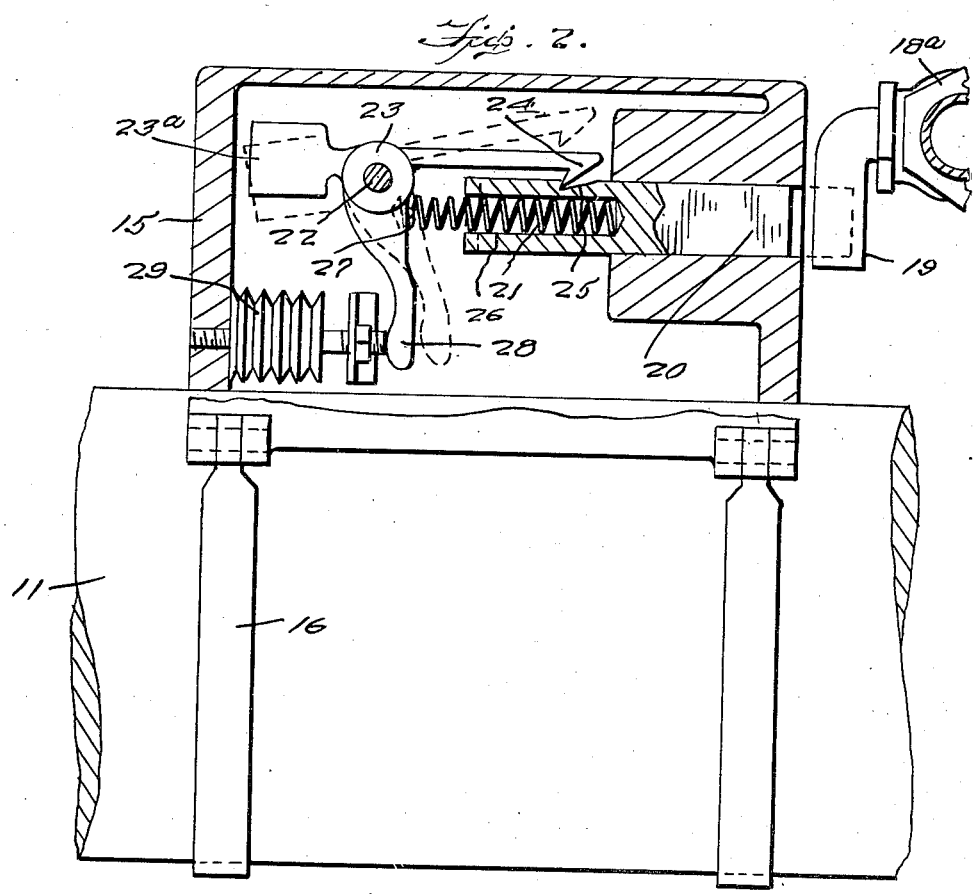
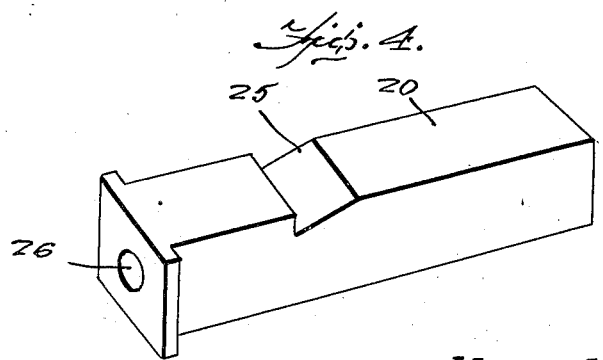
Inventor
HENRY W. CRANWELL,
By *Clarence A. O'Brien*
and *Harvey B. Jacobson*
Attorneys Patented Apr. 8, 1947

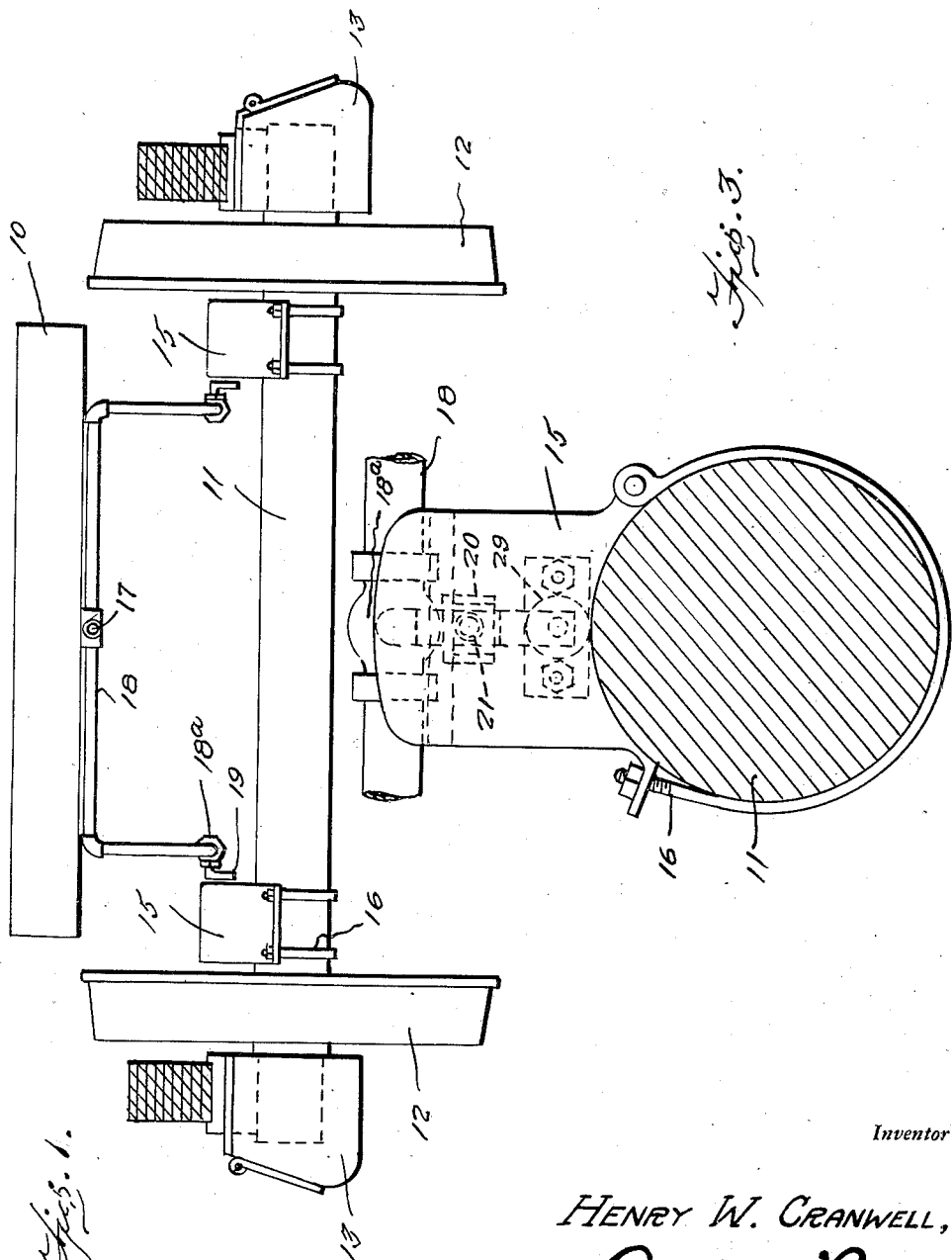

2,418,579

UNITED STATES PATENT OFFICE 2,418,579

AXLE ATTACHMENT FOR DETECTING HOT BOXES

Henry W. Cranwell, Seymour, Conn.

Application June 27, 1944, Serial No. 542,361

4 Claims. (Cl. 246—169)

My invention relates to a device forming an attachment to an axle for detecting overheating or so-called "hot box" and for automatically applying air brakes on a vehicle.

It is well known that axle journals on a train often become so hot that the axle "burns off," dropping a wheel, which has caused very serious accidents and train wrecks as well as great loss of life.

By means of my simple axle attachment such calamities, causing not only train wrecks with considerable destruction of valuable material and loss of life as well as delays, will be entirely prevented and avoided, because this device will act before the axle becomes heated to the danger point and immediately cut off air supply to the brakes so as to automatically stop the train.

This heat detecting device is very simple, of cheap construction, and is most effective so that, beside the main advantage of saving life, it will also save each railroad thousands of dollars every year by preventing train delays, loss of rolling stock and cost in repairs of material.

In the accompanying drawings one embodiment of the invention has been illustrated as applied to a railroad car and wherein—

Figure 1 shows an end elevation of a railroad car with the heat detector unit in position on the axle.

Figure 2 is a vertical, axial section of the heat detector in closed or set position ready for action.

Figure 3 is a transverse section of the wheel axle with the heat detector unit attached; and Figure 4 is a perspective view of the plunger alone.

In the drawings the same reference characters refer to the same details in the different views.

Reference numeral 10 denotes a portion of a railroad car truck with wheel axle 11, wheels 12 and journal boxes 13.

A pair of heat detector housings 15, are properly and solidly mounted to each axle 11 in back of and as close to the wheel 12 as practical by clamping strap 16 or by other suitable means.

Instead of mounting the housings 15 on the axle between the wheels as shown, they may be carried inside the journal boxes 13 attached to the end faces of the car axle.

A suitable pipe connection 18 is provided with the brake airline 17 terminating in a valve 18a normally closed by a crank lever 19 which is located just clear of the rear end of the detector housing 15, secured by straps 16 or other means, and low enough so that the plunger 20 will strike it when in the outward or released position. The plunger 20 of square cross section, is suitably guided, so that when released by the automatic action of the detector, a coil spring 21 will force it outwardly and cause it to turn the valve lever 19 as the detector revolves with the axle 11, thus opening the valve 18a and releasing the air pressure on the brake line.

Behind the spring 21 is pivoted on a stud 22 a trigger 23 having a nose 24 engaging in a notch 25 provided on the top surface of the square sectioned plunger 20, and a counter weight 23a is provided to balance the weight of the trigger arm 23 to compensate for centrifugal force during the revolving of the detector around with the axle 11.

The spring 21 is lodged with one end in a recess 26 furnished in the end of the plunger 20, while its other end presses against the adjacent edge of the trigger 23 engaged by a pin 27. The relative positions between the axis of the plunger 20 and the pivotal stud 22 is such that, while the spring tends to push the plunger outwardly, it simultaneously drives the trigger nose 24 into engagement with the notch 25 to arrest the movement of the plunger 20 in normal or set position.

By this spring action, the tail end 28 of the trigger 23 is also swung in direction to contact with the thermostat 29 secured in suitable position within the box or housing, which, together with the same and the named elements enclosed in the housing, all are made of good heat conducting material in order to quickly detect any rise of temperature in the wheel axle or the journals.

The operation of my heat detector is the following.

Normally, that is, during travel, the parts are set as in Figure 2 with the air line valves closed carrying the full air pressure and each valve lever 19 in position to close the air escape. When properly adjusted, the thermostat 29 is contracted at temperatures below 200° F., permitting the spring 21 to bias the latch 24 into the notch 25, thereby retaining the actuator plunger 20 from movement into a path of travel intersected by the valve lever 19.

Should now for some reason or another the heat of a journal box 13 approach the danger point of 200° F. the thermostat 29, will expand and swing the trigger nose 24 out of engagement with the plunger 20 as indicated by dotted lines in Figure 2. The latter, thus released, will then jump forward, actuated by the spring 21 and as the detector revolves around with the axle, the plunger 20 will turn the crank lever 19 thus opening the valve 18a in the air line 17 and release the air pressure. This will immediately apply all the air brakes on the train and quickly stop the train before any accident can occur, since any journal box, even if beginning to get heated, cannot become hot enough to "burn" or soften the axle to cause it to twist off at the predetermined temperature below 200° F.

This heat detecting device may have other uses as for instance by the plunger actuating an audible or visible signal in connection with an electric power line, an overheated heating system and the like also for use on axles of automobiles and other vehicles.

It is to be understood that the invention as here disclosed is not limited to the details here described and shown but that the same may be varied widely without departing from the spirit of the invention as defined by the subjoined claims.

Having described the invention, what is claimed as new is:

1. A safety device for vehicles having an axle, bearings journalling said axle and a brake control mechanism operatively associated with said axle; comprising, a housing detachably secured to said axle for rotation therewith, a lever actuator for said brake system disposed adjacent the plane of rotation of said housing and mounted upon the chassis of a vehicle, an operator for said lever carried by said housing, and means responsive to overheating of said bearing for moving said operator into operative relation to said lever for actuating said brake mechanism.

2. A safety device for vehicles having an axle, bearings journalling said axle and a brake control mechanism operatively associated with said axle; comprising, a housing detachably secured to said axle for rotation therewith, a lever actuator for said brake system disposed adjacent the plane of rotation of said housing and mounted upon the chassis of a vehicle, an operator for said lever carried by said housing, and means responsive to overheating of said bearing for moving said operator into operative relation to said lever for actuating said brake mechanism, said operator being guided for slidable movement in said housing in a direction parallel to the shaft axis of rotation.

3. A safety device for vehicles having an axle, bearings journalling said axle and a brake control mechanism operatively associated with said axle; comprising, a housing detachably secured to said axle for rotation therewith, a lever actuator for said brake system disposed adjacent the plane of rotation of said housing and mounted upon the chassis of a vehicle, an operator for said lever carried by said housing, and means responsive to overheating of said bearing for moving said operator into operative relation to said lever for actuating said brake mechanism, said means consisting of a resilient means urging said operator into extended position, latch means normally engaging and restraining said operator from extending movement, and thermostatic means for releasing said latch from engagement with said operator upon overheating of said bearing.

4. A safety device for vehicles having an axle, bearings journalling said axle and a brake control mechanism operatively associated with said axle; comprising, a housing detachably secured to said axle for rotation therewith, a lever actuator for said brake system disposed adjacent the plane of rotation of said housing and mounted upon the chassis of a vehicle, an operator for said lever carried by said housing, and means responsive to overheating of said bearing for moving said operator into operative relation to said lever for actuating said brake mechanism, said means consisting of a latch means normally engaging and restraining said operator from extending movement, and thermostatic means for releasing said latch from engagement with said operator upon overheating of said bearing, and a resilient means biasing said operator to extended position and biasing said latch into retaining engagement with said operator.

HENRY W. CRANWELL.

REFERENCES CITED

The following references are of record in the file of this patent:

UNITED STATES PATENTS

| Number | Name | Date |
|---|---|---|
| 846,095 | Dick | Mar. 5, 1907 |
| 838,141 | Sandvoss | Dec. 11, 1906 |
| 117,682 | Richards | Aug. 1, 1871 |
| 1,058,993 | Marvin | Apr. 15, 1913 |
| 1,270,954 | Jordan et al. | July 2, 1918 |
| 2,164,674 | Ziegler | July 4, 1939 |
| 918,463 | Mussleman | Apr. 13, 1909 |

FOREIGN PATENTS

| Number | Country | Date |
|---|---|---|
| 71,982 | Swiss | Aug. 3, 1915 |